Jan. 10, 1950     C. T. WALMSLEY     2,493,792
RECKONING DEVICE

Filed Feb. 5, 1947

INVENTOR
Cecil Thomas Walmsley
BY
ATTORNEYS

Patented Jan. 10, 1950

2,493,792

UNITED STATES PATENT OFFICE 2,493,792

RECKONING DEVICE

Cecil Thomas Walmsley, Canford Cliffs, Bournemouth, England

Application February 5, 1947, Serial No. 726,477
In Great Britain February 5, 1946

3 Claims. (Cl. 235—88)

This invention relates to reckoning or calculating devices of the type comprising a pair of relatively movable members one of which members carries markings or indications which are adapted to be read against markings or indications on or against parts of the other member. The invention is particularly concerned with the calculation of dates or periods of time and it has for one of its objects the provision of an improved device for this purpose.

Cases occur when it is desired to find out on what day of the month an event will occur which is due to take place a predetermined number of days after a known date. Should the event last more than one day it may be desired to show in a simple manner the dates which will be covered by the event.

One example of such a case occurs in connection with the variations of fertility of a woman during the menstrual cycle. It is generally accepted that ovulation takes place a nearly constant number of days after the commencement of the last menstruation and that, for conception to occur, sexual intercourse must take place during a period extending from a few days prior to ovulation, depending on the expected or known fertile life of the male sperm, to the end of the period of ovulation which may last a number of days determined by the active life of the ovum. This period may be regarded as the fertile period, the remainder of the menstrual period being regarded as infertile or sterile, it being held that conception cannot occur during this period.

It is accordingly, an object of the present invention to provide a device which, provided that the date of the start of the last menstruation is known, will show clearly and simply the next fertile or infertile period or both of these. The invention is not, however, limited to such a purpose. Similar problems in connection with dates and periods of time may be encountered in other connections, for example in farming and horticulture. The device according to the invention can readily be made to deal with such problems and many others.

In problems in which calculations are based on the days of the month difficulties arise owing to the different lengths of the various months. It is, therefore, a further object of this invention to provide a device which overcomes these difficulties.

With these and other objects in view there is provided according to the invention a reckoning device comprising a pair of relatively movable members, at least one scale on one of the members, a setting mark on the other of the members adapted to be set against a reading on the said scale and a pair of spaced-apart indicators on the second member which are adapted to be set against a scale on the first member.

For many applications it is necessary or desirable that the first member should be provided with a plurality of different scales, the second member being provided with the appropriate indicators for each scale. These indicators may be constituted by parts of edges of the second member. A single setting mark could be provided for use with all the scales or a separate setting mark might be provided for each scale.

The device may take a number of forms. The two members may, for example, be linearly movable as in the case of an ordinary slide rule or they may comprise a pair of superimposed discs or other flat members rotatably or pivotally connected together. Alternatively the members may comprise a cylinder on which is mounted a sleeve or ring.

According to one embodiment of the invention in which the members are rotatably mounted relatively to each other the scale or scales are circular. In one such construction the device comprises a first member carrying a plurality of concentric circular scales, a second member arranged in front of the first member and means rotatably connecting the first member with the second member, the second member being formed with a window exposing predetermined portions of the said scales and being provided with at least one setting mark against which the scales are adapted to be set. A back plate may be provided rigidly connected with the second member, the first member being rotatably mounted between this back plate and the second member.

In problems involving the calculation of periods of time involving days and months it will, as has been explained, often be found necessary to allow for the different lengths of the various months. This may be done in the device of the invention by providing a number of scales corresponding to the different numbers of days in the month. For example, one scale may be provided for months having 31 days, another for months having 30 days and another for February which usually has 28 days. Leap years in which February has 29 days may be allowed for by providing a fourth scale but, where it is desired to avoid the complication of this, the 28 day scale can be modified slightly to cover a 29 day month with only a slight loss of accuracy.

For the better understanding of the invention a reckoning device which is particularly intended for calculating the fertile and infertile periods of a woman will now be described, by way of example, with reference to the accompanying drawing. In the drawing.

Figure 1:
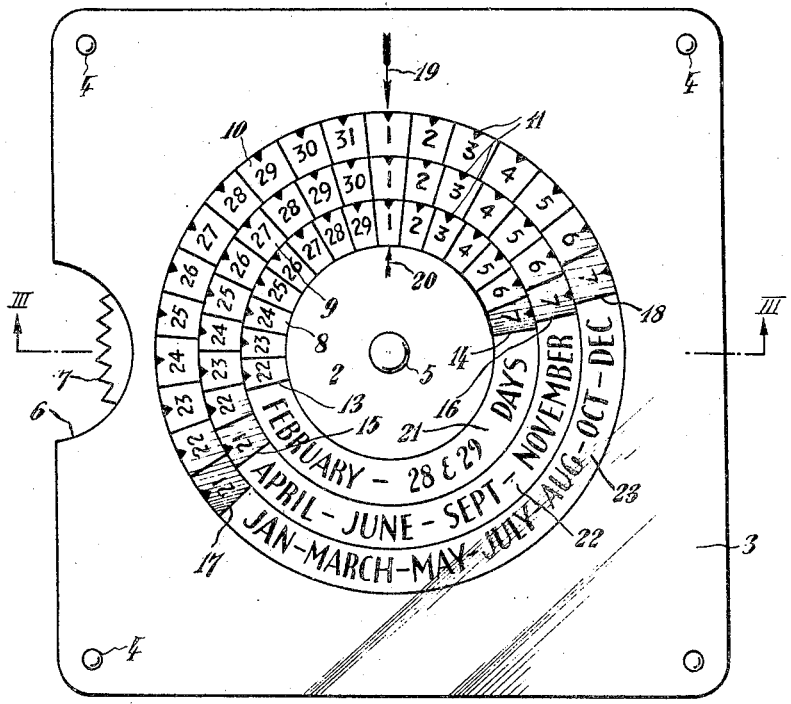
Figure 1 is a front elevational view of the device.
Figure 2:
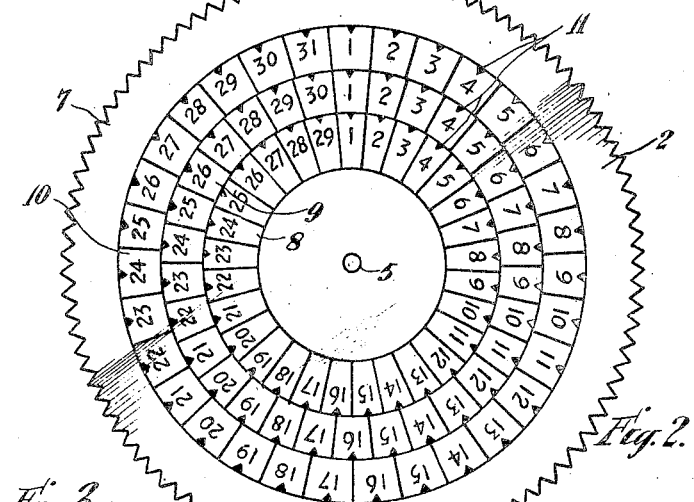
Figure 2 is a similar view showing a part of the device.
Figure 3:
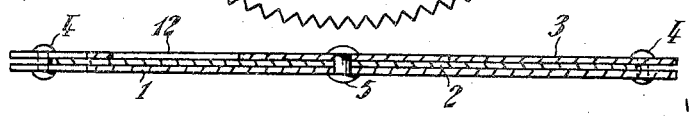
Figure 3 is a section taken on the line III—III of Figure 1.

The device comprises a back plate 1 (Figure 3) a first member 2, which is in the form of a circular disc, and a second or front member 3. These parts may be constructed of any suitable materials such as, for example, wood, card, metal, Celluloid and any of a wide variety of plastics. For the purpose of the present description it will be assumed that all the parts are made of an opaque material, but, as will appear later, it may be preferred to utilise a transparent material at least for the member 3.

The back plate 1 consists of a solid sheet of material of rectangular or other suitable shape, while the member 3 is given a similar external shape. It is attached to the back plate 1 by any suitable means such as, for example, eyelets or rivets 4.

The disc member 2 is rotatably mounted between the back plate 1 and the member 3 by means of a central rivet or eyelet 5. As is shown in the drawing the parts 1 and 3 are formed with similar cut-outs 6 to expose part of the edge 7 of the disc 2. This edge is serrated to enable the disc 2 to be conveniently rotated by the finger.

The disc 2 is inscribed with three concentric scales 8, 9 and 10 which embrace a full 360°. The inner scale 8 is divided up into twenty-nine equal sub-divisions marked with the numbers 1 to 29 the second scale 9 is divided into thirty sub-divisions, numbered 1 to 30, while the outer scale 10 is divided into thirty-one sub-divisions numbered 1 to 31. Each of the sub-divisions is provided with a central mark such as 11 which is intended to be set against the setting mark provided.

The front member 3 is formed with an arcuate cut-out or window 12 which is so shaped and dimensioned as to expose only predetermined portions of the three scales. The portions of the scales 8, 9 and 10 which are exposed are limited by the radially extending edges 13 and 14, 15 and 16, and 17 and 18 respectively of the window 12. These edges constitute in effect the indicators for reading the scales.

The member 3 is provided with a setting mark which, in the construction shown, is represented by the two lines or arrows 19 and 20 inscribed above and below the window 12. The marks 11 of the scales 8 and 10 can be set directly to the setting marks 20 and 19 respectively while when setting the scale 9 the imaginary line joining the two setting marks is used. If preferred, however, it would be possible to provide a setting mark extending across all three scales. Such a setting mark might consist of a line inscribed on a transparent covering provided over the window 12 or on a narrow transparent strip extending across the window.

The positions of the setting mark or marks and of the edges 13 to 18 are carefully selected to suit the purpose in view. While, as has been described, a single setting mark or a pair of aligned marks can be provided for use with all the scales, it would clearly be possible to use differently positioned setting marks for the different scales, provided that the necessary adjustments are made in the positions of the edges 13 to 18.

Preferably the face of the member 3 is marked with arcuate panels 21, 22 and 23 in which are written the names of the months corresponding to the scales 8, 9 and 10 respectively. For ease in reading the different scales and the appropriate inscriptions, they may be printed in different but corresponding colours.

The device shown is designed for use in calculating the fertile and infertile periods of women, it being intended that the infertile period should appear in the window 12 when the date of the start of the last menstruation has been set against the setting marks 19, 20 using the scale appropriate to the month in which the menstruation started.

It has been established that the period of fertility of a woman, i. e., the period during which conception is liable to occur, begins an almost constant number of days after the start of the previous menstruation and lasts for an approximately uniform time. In designing the device shown it has been assumed that the period of fertility begins seven days after the start of menstruation and lasts for thirteen days. It is to be understood, however, that the invention is not limited to any particular intervals since these may be varied to suit particular requirements and in accordance with experimental or other data affecting the problem in hand.

However, on the assumption that the period of fertility lasts for thirteen days from a date seven days after the beginning of menstruation, the device is so constructed that the distances from the setting marks 19, 20 to the edges 14, 16 and 18 of the window correspond in each case to seven days along the appropriate scale. Similarly the distance from the edge 16 to the edge 15 and from the edge 18 to the edge 17 are both equal to thirteen days on the appropriate scale.

A difficulty arises in the case of February since this may contain either 28 days or 29 days and some slight lack of accuracy must be accepted if the added complication of a fourth scale is to be avoided. In the construction shown, in which the scale includes a sub-division corresponding to February 29, it may be considered advantageous to make the distance between the edges 14 and 13 correspond to fifteen days on the scale 8, this being one more than on the other scales. Alternatively it might be decided to give the scale 8 twenty-eight divisions and to make the distance from the edge 14 to the edge 13 equal to thirteen days as in the case of the other scales.

To use the device the date of the start of the last menstruation is set against the setting mark 19, 20 using the scale appropriate to the month. Thus if the date was June 1, the second scale 9 is used. The device now indicates that the woman will be infertile from that date until June 7, which is the last date visible. She will then be fertile for a period including the dates between the edges 16 and 15 obscured by the member 3 and will be infertile from the next date visible (i. e. June 21) until after the start of the next menstrual cycle. When the next menstruation starts the device is reset to give the date when the infertile period ends and the next fertile period begins.

It will be seen that the device calculates afresh for every month and is not dependent on every menstrual cycle being of exactly the normal length of 28 days. In other words any errors are not cumulative. Furthermore, the calculation is correct even when the intervals computed extend over the end of one month into the next, irrespective of the lengths of the months, the only exception to this being in February when, as has been stated, slight errors may be introduced owing to the allowance for leap years.

Should it be desired to expose the scales over the fertile period and to obscure them during the infertile period, this could obviously be done provided that a small additional window is provided adjacent the setting marks to enable the scales to be set to the marks. Alternatively the entire scales could remain visible, suitable means being provided for indicating the fertile and infertile periods.

In a modified form of construction the front member 3 may be made of a suitable transparent material. The part of this member corresponding to the window 12 could be left transparent and the remainder obscured by paint or other suitable means or the different periods could be indicated by making parts of the member 3 of different colours or by providing it with any suitable markings on its face.

If desired instructions for the use of the device may be printed on the front of the member 3 or on the back of the plate 1. A permanent calendar may also be provided, for example on the back of the device, on which the user could mark the first day of each menstruction.

Various other constructional forms are possible for the device. For example, the scales may be marked circumferentially round a cylinder which is provided with a rotatable sleeve. This sleeve could either be made partly transparent and partly opaque or it could be provided with cut-away parts or windows, the principle being the same as for the disc arrangement.

Alternatively one of the members could take the form of a straight rule carrying linear scales. The other member could then be slidably mounted in front of this rule, this second member being provided with opaque and transparent or cut-away sections arranged according to the principles already set forth. If preferred the two members might be arranged side by side.

It will be apparent that the invention provides a device which is simple and convenient to operate and which is capable of many uses. In the embodiment which has been more particularly described a device is provided which is of very great value both from the medical and social aspect. Many married couples are ignorant of many of the factors affecting conception and the device provides in a clear and simple manner information the use of which will be of the greatest assistance to couples desiring children. The device can of course also be used to assist in obtaining the correct spacing of families.

As has been stated, however, the invention is not limited to the particular device and uses described, but it is capable of many other applications.

I claim:

1. In a reckoning device: a pair of relatively movable members; a plurality of different scales on one of said members; each of said scales being of substantially equal total effective lengths and each scale being subdivided into a different number of substantially evenly spaced divisions and the effective lengths of the individual divisions being different for different scales; at least one setting mark on the other of said members against which a selected division indication on any one of said scales may be set; said other member having for each of said different scales a correlated pair of spaced-apart indicators for indicating on the respective scales desired spaced division indications which are correlated to a selected division indication.

2. In a reckoning device: a pair of relatively rotatable members; a plurality of different scales arranged concentrically on one of said members; said scales being of substantially equal total angular lengths and each scale being sub-divided into a different number of substantially evenly spaced divisions, and the angular lengths of the individual divisions being different for the different scales; the different divisions of each scale having correlated division indications characteristic of the different scales; at least one setting mark on the other of said members against which a selected division indication on any one of said scales may be set; said other member having for each of said scales a correlated pair of angularly spaced indicators for indicating on the respective scales desired spaced division indications which are correlated to a selected division indication.

3. In a reckoning device: a pair of members joined for relative rotation therebetween; a plurality of different scales on one of said members arranged concentrically with the axis of rotation thereof and extending through a full length of their circular peripheries; said individual scales being sub-divided into different numbers of evenly-spaced divisions; and the effective length of the individual divisions being different for different scales; at least one setting mark on the other of said members against which a selected division indication on any one of said scales may be set; said other member having for each of said different scales a correlated pair of angularly-spaced indicators for indicating on the respective scales desired spaced division indications which are correlated to a selected division indication.

CECIL THOMAS WALMSLEY.

REFERENCES CITED

The following references are of record in the file of this patent:

UNITED STATES PATENTS

| Number | Name | Date |
| --- | --- | --- |
| 2,034,027 | Decary et al. | Mar. 17, 1936 |
| 2,076,242 | Marquis | Apr. 6, 1937 |